US012036786B2

(12) United States Patent
Hioki

(10) Patent No.: US 12,036,786 B2
(45) Date of Patent: Jul. 16, 2024

(54) LIGHT IRRADIATOR AND PRINTER

(71) Applicant: KYOCERA CORPORATION, Kyoto (JP)

(72) Inventor: Ryuya Hioki, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 149 days.

(21) Appl. No.: 17/904,482

(22) PCT Filed: Feb. 24, 2021

(86) PCT No.: PCT/JP2021/006836
§ 371 (c)(1),
(2) Date: Aug. 18, 2022

(87) PCT Pub. No.: WO2021/172346
PCT Pub. Date: Sep. 2, 2021

(65) Prior Publication Data
US 2023/0102256 A1 Mar. 30, 2023

(30) Foreign Application Priority Data
Feb. 26, 2020 (JP) ................................ 2020-030614

(51) Int. Cl.
*B41J 11/00* (2006.01)
*G03G 15/20* (2006.01)

(52) U.S. Cl.
CPC .... *B41J 11/00218* (2021.01); *B41J 11/00214* (2021.01); *B41J 11/00216* (2021.01); *G03G 15/2098* (2021.01)

(58) Field of Classification Search
CPC ............ B41J 11/00218; B41J 11/00214; B41J 11/00216; B41J 29/377; B41J 2/01; B41J 13/0045; G03G 15/2098
See application file for complete search history.

(56) References Cited

U.S. PATENT DOCUMENTS

2012/0275152 A1 11/2012 Payne
2013/0221245 A1 8/2013 Till
2019/0128511 A1* 5/2019 Watanabe ............... F21V 29/83

FOREIGN PATENT DOCUMENTS

JP 2010257667 A 11/2010
JP 3190306 U 5/2014
JP 3196411 U 3/2015
JP 2018134815 A 8/2018

* cited by examiner

*Primary Examiner* — Bradley W Thies
(74) *Attorney, Agent, or Firm* — HAUPTMAN HAM, LLP

(57) ABSTRACT

A light irradiator includes a light source and its drive, a heat-dissipating member, and a rectangular housing with vents and a light-emission opening. The housing includes a first surface having a first side with a first dimension and a second side with a second dimension, a second surface having the second side and a third side with a third dimension, and a third surface having the first and third sides. The light-emission opening is in the first surface. First and second vents are in the second surface, with the first vent nearer the opening than the second vent, and the second vent opposite to the opening. An axial fan and a first plate are at the second vent. The first plate faces the axial fan with a spacing less than or equal to the first dimension between them. A second plate outside the housing separates the first and second vents.

8 Claims, 4 Drawing Sheets

LIGHT IRRADIATOR AND PRINTER

CROSS-REFERENCE TO RELATED APPLICATION(S)

This application is a national stage application of International Application No. PCT/JP2021/006836, filed on Feb. 24, 2021, which is based upon and claims the benefit of priority to Japanese Patent Application No. 2020-030614, filed on Feb. 26, 2020.

TECHNICAL FIELD

The present disclosure relates to a light irradiator and a printer including the light irradiator.

BACKGROUND OF INVENTION

A light irradiator includes a light source and a drive board for driving the light source both accommodated in a housing. Examples of the light source include lamps or LEDs (light-emitting diodes) that emit ultraviolet rays or infrared rays. Such light irradiators are commonly used in healthcare including sterilization, assembly production including curing of adhesives or ultraviolet curable resins in electronic packaging, drying including irradiation of targets with infrared rays for efficient drying, and printing including drying or curing of inks.

Among different purposes, light irradiators for printing are designed for higher output of light for recent faster printing and are also to be miniaturized for space-saving.

A light source included in a light irradiator generates heat when emitting light. The light source emitting more light may generate more heat. To effectively dissipate heat and also miniaturize the light irradiator, the light irradiator may further include a heat sink (heat-dissipating member) thermally connected to the light source and accommodated together in the housing (refer to, for example, Japanese Registered Utility Model Nos. 3190306 and 3196411).

SUMMARY

In an aspect of the present disclosure, a light irradiator includes a light source including a plurality of light emitters, a heat-dissipating member thermally connected to the light source, a drive including a drive circuit for the light source, and a housing that is configured to accommodate the light source, the heat-dissipating member, and the drive. The housing includes a plurality of vents and a light-emission opening to allow light from the light source to pass. The housing is rectangular and includes a first surface having a first side with a first dimension and a second side with a second dimension greater than the first dimension, a second surface having the second side and a third side with a third dimension greater than the second dimension, and a third surface having the first side and the third side. The light-emission opening is in the first surface. A first vent and a second vent are in the second surface. The first vent is nearer the light-emission opening than the second vent. The second vent is located opposite to the light-emission opening. The light source is adjacent to the light-emission opening. The heat-dissipating member faces the first vent. The drive is between the first vent and the second vent. The light irradiator includes an axial fan at the second vent. The axial fan blows air from inside the housing to outside. The axial fan has a fan size greater than the first dimension and less than the second dimension. The light irradiator includes a first plate at the second vent. The first plate faces the axial fan with a spacing less than or equal to the first dimension between the first plate and the axial fan. The light irradiator includes a second plate outside the housing. The second plate separates the first vent and the second vent.

In another aspect of the present disclosure, a printer includes the light irradiator according to the above aspect of the present disclosure, a feeder that feeds a print medium to be irradiated with light emitted from the light irradiator through the light-emission opening, and a printing unit upstream from the light irradiator in a feed direction of the print medium.

DESCRIPTION OF EMBODIMENTS

A light irradiator may include, as well as a light source, a drive, a blower, and a heat-dissipating member such as a heat sink, all accommodated in a single housing. Such a light irradiator may not achieve miniaturization and sufficient heat dissipation at the same time.

In particular, a light irradiator included in a printer may be designed thinner for miniaturization. More specifically, the light irradiator may be generally rectangular and have a large width in the width direction of a print medium being fed, a small thickness in the feed direction, and a length in the direction orthogonal to the print medium larger than the width and the thickness. However, such a thin light irradiator may fail to include an effective passage of air flowing into and out of the housing for cooling the light source.

A thin, small, and high-output light irradiator that can efficiently cool the light source is awaited.

A light irradiator according to one or more embodiments of the present disclosure efficiently cools the light source with an axial fan and is also thin and small, and has improved light output.

A printer according to one or more embodiments of the present disclosure includes the thin and small light irradiator with improved cooling performance according to one or more embodiments of the present disclosure. The printer is thus small and efficient.

A light irradiator and a printer according to one or more embodiments of the present disclosure will now be described with reference to the drawings.

Figure 1:
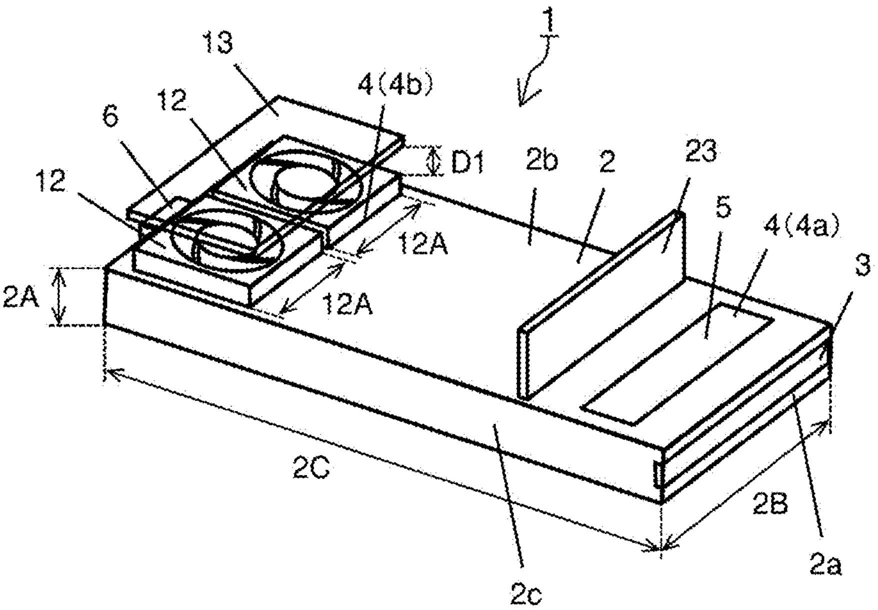
FIG. 1 is a schematic perspective view of a light irradiator according to an embodiment of the present disclosure.
Figure 2A:
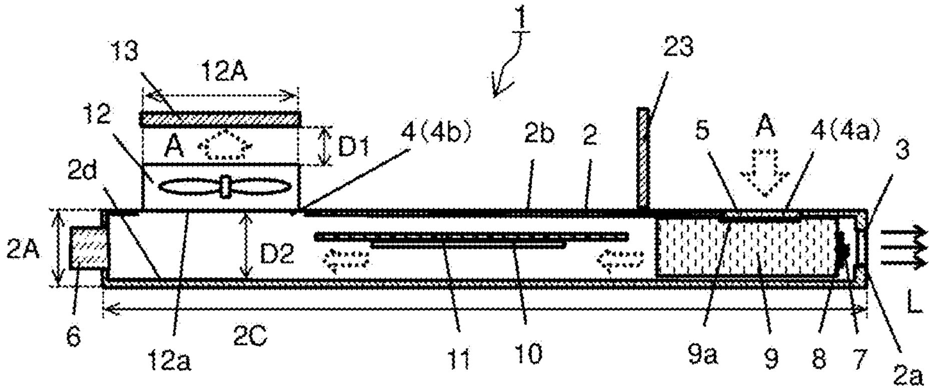
FIG. 2A is a schematic cross-sectional view of the light irradiator according to the embodiment of the present disclosure.

FIG. 1 is a schematic perspective view of a light irradiator according to an embodiment of the present disclosure. FIG. 2A is a schematic cross-sectional view of the light irradiator according to the embodiment of the present disclosure. The directional terms such as up and down (or vertical) and right and left (or lateral) are used herein for clarity without limiting the structures or operating principles of the light irradiator and the printer.

A light irradiator 1 illustrated in FIGS. 1 and 2A includes a light source 7 including multiple light emitters, a heat-dissipating member (heat sink) 9 thermally connected to the light source 7, a drive 11 including a drive circuit 10 for the light source 7, and a housing 2 that is configured to accommodate the light source 7, the heat-dissipating member 9, and the drive 11. The housing 2 includes multiple vents 4 (4a and 4b) and a light-emission opening 3 that allows light from the light source 7 to pass. The light irradiator 1 includes an axial fan 12 as a blower for blowing air to generate airflow into and out of the housing 2 through the vents 4 (4a and 4b).

The axial fan 12 in the housing 2 is located at a second vent 4b to generate flow of the outside air (air) through a first vent 4a as an inlet and the second vent 4b as an outlet. The axial fan 12 is used for effective dissipation of heat from the heat-dissipating member 9 and the drive 11. The axial fan 12 with a small size can generate a large volume of airflow, and thus may be used to miniaturize and reduce the thickness of the light irradiator 1.

The housing 2 includes a connector 6 on its surface opposite to the surface with the light-emission opening 3 in the longitudinal direction. The connector 6 is used to connect a wire to the drive 11 and direct the wire out of the housing 2. The drive 11 receives power from an external source and exchanges control signals with an external component through the connector 6. The drive circuit 10 in the drive 11 is electrically connected to the light source 7 with a light source substrate 8 in between with wiring members (not illustrated).

The housing 2 is rectangular and includes a first surface 2a (the right end face in FIGS. 1 and 2A) having a first side with a first dimension 2A and a second side with a second dimension 2B greater than the first dimension 2A, a second surface 2b (the top surface in FIGS. 1 and 2A) having the second side and a third side with a third dimension 2C greater than the second dimension 2B, and a third surface 2c (the front lateral surface in FIG. 1) having the first side and the third side. The housing 2 includes the light-emission opening 3 in the first surface 2a, and the first vent 4a and the second vent 4b in the second surface 2b. The first vent 4a is nearer the light-emission opening 3 than the second vent 4b, and the second vent 4b is located opposite to the light-emission opening 3. The light source 7 is adjacent to the light-emission opening 3. The heat-dissipating member 9 faces the first vent 4a. The drive 11 is between the first vent 4a and the second vent 4b. The axial fan 12 is located at the second vent 4b.

The housing 2 defines the profile of the light irradiator 1. The housing 2 is made of a metal such as aluminum or iron or a plastic. The housing 2 in the present embodiment is rectangular and includes the first surface 2a having the first side with the first dimension 2A and the second side with the second dimension 2B, the second surface 2b having the second side and the third side with the third dimension 2C, and the third surface 2c having the first side and the third side. The housing 2 includes the light-emission opening 3 in the first surface 2a to allow light from the light source 7 to be emitted outside. FIG. 2A illustrates three arrows on the right of the light-emission opening 3 to indicate light L being emitted. The housing 2 includes the vents 4 (4a and 4b) in the second surface 2b. The first vent 4a is nearer the light-emission opening 3 than the second vent 4b, and the second vent 4b is located opposite to the light-emission opening 3.

The housing 2 has a thin rectangular profile and has dimensions determined as appropriate in accordance with the specifications of the light irradiator 1. For example, the housing 2 has the first side with the first dimension 2A (corresponding to the thickness of the housing 2) of 20 to 40 mm, the second side with the second dimension 2B (corresponding to the width of the housing 2) of 80 to 120 mm, and the third side with the third dimension 2C (corresponding to the length of the housing 2) of 120 to 250 mm. The housing 2 is not limited to the above dimensions and may simply satisfy (first dimension 2A)<(second dimension 2B)<(third dimension 2C). The dimensions may be determined as appropriate for the use of the light irradiator 1. In one embodiment, the light irradiator 1 is included in a printer such as a line printer that includes a printing unit including printheads with substantially the same width as the print medium. In this case, multiple light irradiators 1 may be arrayed to have substantially the same width as the print medium and have dimensions determined as appropriate for the array. In another embodiment, the light irradiator 1 is used for temporarily curing ultraviolet curable inks in multiple colors printed on the print medium using multiple printheads. In this case, the light irradiator 1 is located in each small area between the printheads for the colors. Thus, the thickness of the housing 2 may be minimized. The light irradiator 1 may have a width corresponding to the width of each printhead (e.g., 120 mm) and can have the length with less restrictions. Thus, the light irradiator 1 may have the first dimension 2A (thickness) of about 20 mm, the second dimension 2B (width) of about 120 mm, and the third dimension 2C (length) of about 220 mm. The light irradiator 1 with such dimensions is thin and small. The housing 2 may not be precisely rectangular. The housing 2 may have the sides and corners rounded or chamfered as appropriate for its use and specifications. In this case, the first to third dimensions 2A to 2C may be defined as distances between two surfaces along the corresponding sides.

The housing 2 includes the light-emission opening 3 in the first surface 2a to allow light from the light source 7 to be emitted outside to irradiate a target, such as a print medium. When the housing 2 has the first dimension 2A (thickness) of about 20 mm as described above, the light-emission opening 3 may be about 13 mm along the first dimension 2A. When the housing 2 has the second dimension 2B of about 120 mm as described above, the light-emission opening 3 may be about 120 mm along the second dimension 2B. The light-emission opening 3 may extend across the first surface 2a of the housing 2 in the width direction (or the depth direction in FIG. 2A) for miniaturizing the housing 2 and providing continuous radiation with multiple housings 2 arrayed adjacent to each other. However, the light-emission opening 3 may have any other structure.

The light-emission opening 3 is typically rectangular in the same or similar manner to the first surface 2a. However, the light-emission opening 3 may have any of various shapes in accordance with the use, including the shape of waves, an ellipse, or multiple circles. The light-emission opening 3 may have any dimensions determined as appropriate within the dimensions of the first surface 2*a* in accordance with the use of the light irradiator 1. The light-emission opening 3 is typically located in the central portion including the center of the first surface 2*a* of the housing 2. However, the light-emission opening 3 may be open toward the light source 7 at a position offset from the center of the first surface 2*a*. The housing 2 may include a cover for the light-emission opening 3 as in the present embodiment. The cover may be made of a material that transmits light from the light source 7, such as glass or a heat-resistant plastic.

The housing 2 includes the vents 4 in the second surface (top surface) 2*b*. The vents 4 allow air to flow into and out of the housing 2, or in other words, allow the outside air to flow into and out of the housing 2. The vents 4 include the first vent 4*a* and the second vent 4*b* in the second surface 2*b*. In the second surface 2*b*, the first vent 4*a* is nearer the light-emission opening 3 in the first surface 2*a* than the second vent 4*b*, and the second vent 4*b* is near an end opposite to the light-emission opening 3.

The light irradiator 1 includes the heat-dissipating member (heat sink) 9 located opposite to the light-emission opening 3 from the light source 7 and thermally connected to the light source 7 in the housing 2. The heat-dissipating member 9 faces the first vent 4*a*. In the embodiment illustrated in FIG. 2A, the heat-dissipating member 9 is on the left of the light source 7 and thermally connected to the light source 7 with the light source substrate 8 receiving the light source 7 in between. The housing 2 includes the drive 11 between the first vent 4*a* and the second vent 4*b*. The drive 11 includes the drive circuit 10. The axial fan 12, which is a blower, faces the second vent 4*b*.

The housing 2 includes, near its both ends, the first vent 4*a* and the second vent 4*b* in the second surface 2*b*. The heat-dissipating member 9 faces the first vent 4*a*. The drive 11 is between the first vent 4*a* and the second vent 4*b*. The axial fan 12 faces the second vent 4*b*. The axial fan 12 blows air outside the housing 2 through the second vent 4*b* to cause smooth flow of air A from outside through the first vent 4*a*, the heat-dissipating member 9, the drive 11, and the second vent 4*b* and the axial fan 12, and then outside, as indicated by the broken line arrows in FIG. 2A. This reduces stagnant air in the housing 2 and efficiently dissipates heat and cools the heat-dissipating member 9 and the drive 11. The thin and small light irradiator 1 can thus reduce heat from the light source 7.

To generate a sufficient volume of airflow during operation, a space of at least substantially a quarter of a fan size 12A is typically to be left at the air intake of the axial fan 12. The fan size 12A is the outer size of the frame of the axial fan 12. The fan size 12A may be 40 mm for the axial fan 12 being a 40-mm square or a circle with a diameter of 40 mm. For the square or circular axial fan 12 having the fan size 12A of 40 mm, a space of substantially a quarter of 40 mm, or 10 mm, is typically to be left at the intake of the axial fan 12. However, a thin light irradiator 1 as in the present embodiment may not allow a space of at least substantially a quarter of the fan size 12A to be left inside the housing 2, or specifically, at the air intake of the axial fan 12 at the second vent 4*b* in the housing 2. This may reduce the velocity and the volume of airflow from the axial fan 12 and may not allow the heat-dissipating member 9 to be maintained at an intended temperature of, for example, 60° C., possibly causing the light emitters in the light source 7 to exceed a junction temperature of, for example, 125° C. at which the light emitter can operate stably.

For example, the axial fan 12 with the fan size 12A of 40 to 50 mm may use a space less than or equal to substantially a quarter of the fan size 12A at its intake. In this case, the axial fan 12 may generate exhaust airflow with a velocity decreasing to about 40 to 60% from the airflow defined by the specifications for the airflow using a space greater than substantially a quarter of the fan size 12A at the intake. This may disable the heat-dissipating member 9 from being maintained at an intended temperature.

The inventor has noticed through studies that a first plate facing and adjacent to the outlet of the axial fan 12 can increase the velocity of exhaust airflow from the axial fan 12 by about 25 to 175%. This structure increases the velocity and the volume of airflow to achieve sufficient ventilation performance, thus maintaining the heat-dissipating member 9 at an intended temperature (specifically, for example, about 60° C.) when the thin housing 2 cannot have a sufficient space at the intake of the axial fan 12 and lowers the ventilation performance of the axial fan 12 below the level defined by the specifications of the axial fan 12. The light irradiator 1 according to the embodiment of the present disclosure is based on these findings.

In the light irradiator 1 according to the present embodiment, the axial fan 12 at the second vent 4*b* has the fan size 12A greater than the first dimension 2A and less than the second dimension 2B. The light irradiator 1 includes a first plate 13 opposite to the housing 2 from the axial fan 12. The first plate 13 faces the axial fan 12 with a spacing D1 less than or equal to the first dimension 2A between the first plate 13 and the axial fan 12. The spacing D1 is the distance between the axial fan 12 and the first plate 13. The first plate 13, which faces the axial fan 12 with the spacing D1 less than or equal to the first dimension 2A between the first plate 13 and the axial fan 12, allows the axial fan 12 to generate airflow at an intended velocity and in an intended volume without decreasing the velocity and the volume when the space at the intake of the axial fan 12 is less than or equal to the first dimension 2A and cannot be at least substantially a quarter of the fan size 12A. The inventor has noticed through studies that the first plate 13 can prevent a decrease in the velocity and the volume of airflow from the axial fan 12. In the light irradiator 1 including the thin housing 2, the axial fan 12 can thus generate airflow at an intended velocity and in an intended volume. The heat-dissipating member 9 can thus have an intended temperature of, for example, not higher than 60° C. The light emitters in the light source 7 can have a junction temperature of, for example, not higher than 125° C. for a stable operation. The light irradiator 1 can thus operate stably for a long time.

The first plate 13 may be any member that can serve as a baffle that obstructs the exhaust airflow from the axial fan 12. The first plate 13 may be made of any of various materials that can obstruct airflow and withstand heat from the exhaust airflow from the axial fan 12. Examples of the materials include various metals such as aluminum, iron, stainless steel, or copper, various plastics such as epoxy resins, phenolic resins, fluoropolymers, polycarbonates, or polypropene, or paper or wood, or any combination of these materials. FIG. 1 is a perspective view of the first plate 13 as viewed through. The first plate 13 may be transparent, semitransparent, or opaque. The first plate 13 may have the same or similar color to the housing 2 or the axial fan 12, or may have a different color. The first plate 13 may be placed using any of various components that do not provide excessive resistance to the exhaust airflow from the axial fan 12. The first plate 13 may be placed using spacers with any of various dimensions and shapes, such as rod-like, tubular, columnar, or plate-like spacers or using screws to support the first plate 13 from below. In some embodiments, the first plate 13 may be placed using components fixed to the housing 2 to support the first plate 13 from above or laterally.

The first plate 13 may basically have a size substantially equal to the fan size 12A of the axial fan 12 facing the first plate 13. The first plate 13 may have the same shape as or a similar shape to the axial fan 12. The first plate 13 may have the size adjusted to maintain performance. For example, the first plate 13 may cover an area larger than the axial fan 12 or smaller than the area defined by the periphery of the axial fan 12. The first plate 13 may have any thickness. The first plate 13 may have a minimum thickness to reduce the thickness of the light irradiator 1 but may be relatively thick to increase strength and durability. In some embodiments, a block that can serve as the first plate 13 may be used instead.

Figure 2B:
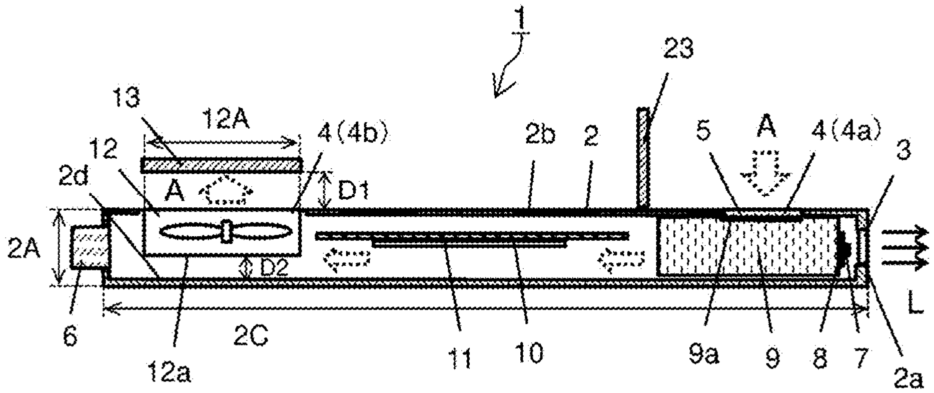
FIG. 2B is a schematic cross-sectional view of a light irradiator according to another embodiment of the present disclosure.

In the embodiment illustrated in FIGS. 1 and 2A, the axial fan 12 is outside the housing 2 to be located at the second vent 4*b*. In another embodiment, the axial fan 12 may be located inside the housing 2 through the second vent 4*b*, as illustrated in a cross-sectional view of FIG. 2B similar to FIG. 2A, or the axial fan 12 may be entirely inside the housing 2. In FIG. 2B, like reference numerals denote like components in FIG. 2A, and such components are not described. In some embodiments, the axial fan 12 may extend across inside and outside the housing 2 at an intermediate position between the positions illustrated in FIGS. 2A and 2B. In other words, the axial fan 12 includes a surface 12*a* facing the internal space of the housing 2, and the surface 12*a* may be flush with the second surface 2*b* of the housing 2 or may be located inside the housing 2.

For the surface 12*a* of the axial fan 12 facing the internal space of the housing 2 and flush with the second surface 2*b* of the housing 2, the surface 12*a* is in the same plane as the second surface 2*b*, and the axial fan 12 is located outside the housing 2. For the surface 12*a* of the axial fan 12 facing the internal space of the housing 2 and located inside the housing 2, the axial fan 12 extends across inside and outside the housing 2 or is located inside the housing 2. The light irradiator 1 including the axial fan 12 located partially or entirely inside the housing 2 can be thinner and smaller. The axial fan 12 located outside the housing 2 allows a greater space at the air intake of the axial fan 12 and thus may have higher performance. In either case, the light irradiator 1 includes the first plate 13 facing the axial fan 12 with the spacing D1 less than or equal to the first dimension 2A between the first plate 13 and the axial fan 12. The thin and small light irradiator 1 can thus improve the ventilation performance of the axial fan 12 that is likely to generate a small volume of air, and effectively cool the heat-dissipating member 9 and the light source 7 despite a limited space left at the air intake of the axial fan 12.

In the light irradiator 1 according to the embodiment of the present disclosure, the axial fan 12 may be separated from an inner surface 2*d* of the housing 2 facing the second vent 4*b* by a spacing D2 less than or equal to the first dimension 2A and less than or equal to substantially a quarter of the fan size 12A of the axial fan 12. When the spacing D2 is less than or equal to the first dimension 2A, the axial fan 12 is at least partially located inside the housing 2. With the spacing D1 between the first plate 13 and the axial fan 12, the light irradiator 1 with this structure including the first plate 13 facing the axial fan 12 can be thinner. When the spacing D2 is less than or equal to substantially a quarter of the fan size 12A of the axial fan 12, the space at the air intake of the axial fan 12 may be insufficient for maintaining typical ventilation performance such as the velocity or the volume of airflow. The light irradiator 1 according to the embodiment of the present disclosure includes the first plate 13 facing the axial fan 12 with the spacing D1 between the first plate 13 and the axial fan 12. This increases the ventilation performance of the axial fan 12 and achieves intended cooling. The thin light irradiator 1 can thus operate stably for a long time.

The spacing D2 is basically less than or equal to a quarter of the fan size 12A of the axial fan 12. However, this may slightly vary in accordance with the shapes and specifications of the components of the axial fan 12 or the shapes of the components around the axial fan 12 in the housing 2. With the boundary condition less strictly defined, the spacing D2 is to be less than or equal to substantially a quarter of the fan size 12A of the axial fan 12. In one example studied by the inventor, the fan size 12A was 40 mm, and the quarter is 10 mm. In this example, the airflow velocity decreased for the spacing D2 of 9 mm. The airflow velocity decreased greatly, by about 40%, for the spacing D2 of 8 mm. For the spacing D2 of 8 mm, the first plate 13 was placed to face the axial fan 12 with the spacing D1 between the first plate 13 and the axial fan 12. The first plate 13 increased the airflow velocity by up to about 25% from the decreased velocity and maintained the heat-dissipating member 9 at an intended temperature of about 60° C. In another example, the fan size 12A was 50 mm, and the quarter was 12.5 mm. In this example, the airflow velocity decreased for the spacing D2 of 12 and 11 mm. The airflow velocity decreased greatly, by about 60%, for the spacing D2 of 8 mm. For the spacing D2 of 8 mm, the first plate 13 was placed to face the axial fan 12 with the spacing D1 between the first plate 13 and the axial fan 12. The first plate 13 increased the airflow velocity by up to about 175% from the decreased velocity and maintained the heat-dissipating member 9 at an intended temperature of about 60° C.

The housing 2 with the spacing D2 close to 0 mm obstructs airflow from the axial fan 12 and is impractical. The light irradiator 1 may thus be large enough to be practical while it is being miniaturized. The light irradiator 1 may thus have the spacing D2 of at least substantially one-eighth of the fan size 12A of the axial fan 12. For the fan size 12A of 40 mm, the spacing D2 may be about 5 mm or greater, which is at least substantially one-eighth of the fan size. For the fan size 12A of 50 mm, the spacing D2 may be about 6 mm or greater, which is at least substantially one-eighth of the fan size.

Figure 3:
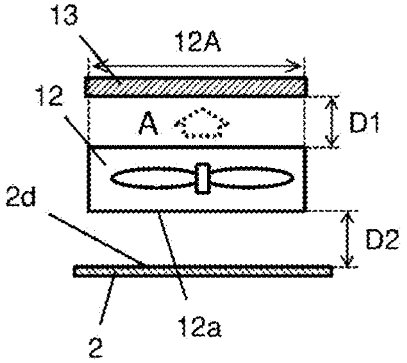
FIG. 3 is a cross-sectional view of an axial fan and a first plate for the light irradiator according to the embodiment of the present disclosure, describing the spacings between the axial fan and the first plate and between the axial fan and a housing.

The spacing D1 between the axial fan 12 and the first plate 13 may be less than the spacing D2 between the axial fan 12 and the inner surface 2*d* of the housing 2 opposite to the second surface 2*b*. For easy understanding, FIG. 3 is a cross-sectional view of the main part describing the relationship between the spacing D1 and the spacing D2. In FIG. 3, the same reference numerals as in FIGS. 1, 2A, and 2B are used. Although the spacing D2 less than or equal to substantially a quarter of the fan size 12A of the axial fan 12 can lower the ventilation performance of the axial fan 12, the first plate 13 facing the axial fan 12 with the spacing D1 less than the spacing D2 between the first plate 13 and the axial fan 12 can increase the ventilation performance of the axial fan 12 to achieve intended cooling effectively.

For the fan size 12A of, for example, 40 mm, the airflow velocity decreased greatly, or by about 40%, with the spacing D2 of 8 mm as described above. In this case, the first plate 13 was placed with the spacing D1 of, for example, 7 to 3 mm, less than the spacing D2 to increase the airflow velocity by up to about 25% from the decreased velocity. For the fan size 12A of, for example, 50 mm, the airflow velocity decreased greatly, or by about 60%, with the spacing D2 of 8 mm. In this case, the first plate 13 was placed with the spacing D1 of, for example, 7 to 3 mm, less than the spacing D2 to increase the airflow velocity by up to about 175% from the decreased velocity.

In the embodiments illustrated in FIGS. 1, 2A, and 2B, the axial fan 12 extends parallel to the second surface 2*b* and the inner surface 2*d* of the housing 2 (or in other words, blows air orthogonally to the second surface 2*b*). However, the axial fan 12 may be inclined with its left portion downward in the figures. The inclined axial fan 12 allows air to efficiently flow out of the housing 2. The inclined axial fan 12 also sends air away from the light-emission opening 3 through the second vent 4*b*, thus allowing the print medium to be less susceptible to the airflow.

The first vent 4*a* and the second vent 4*b* in the second surface 2*b* of the housing 2 may be at any of various positions or may have any shapes and sizes adjusted and determined as appropriate for the use and specifications of the light irradiator 1 and the specifications of the heat-dissipating member 9 and the axial fan 12. The second vent 4*b*, at which the axial fan 12 is located, may be about one to two times the size of the first vent 4*a* to allow efficient ventilation.

In the embodiments illustrated in FIGS. 1, 2A, and 2B, two axial fans 12 are located at the second vent 4*b* in the housing 2. One or three or more axial fans 12 may be included in accordance with the specifications and the sizes of the light irradiator 1 and the housing 2.

In one or more embodiments of the present disclosure, the light irradiator 1 includes a second plate 23 outside the housing 2 to separate the first vent 4*a* and the second vent 4*b*. The inventor has noticed that such a second plate 23 located outside the housing 2 can restore or improve the performance of the axial fan 12 in the light irradiator 1 with the spacing D1 and the spacing D2 both limited with respect to the axial fan 12.

Although the lower performance of the axial fan 12 can result from the short spacing D2 on the inlet end, the ventilation through the housing 2, performed by the axial fan 12 assembled specifically into the light irradiator 1, can also be affected by the airflow around the housing 2, as identified by the inventor through various experiments. The inventor has revealed that the exhaust airflow from the axial fan 12 from inside the housing 2 through the second vent 4*b* travels along the outer surface of the housing 2 to the first vent 4*a* and is sucked back into the housing 2 through the first vent 4*a*, generating airflow circulating between the second vent 4*b* and the first vent 4*a*. This can lower the ventilation performance of the axial fan 12, although the actual reason remains unknown. In contrast, as illustrated in FIGS. 1, 2A, and 2B, the second plate 23 outside the housing 2 to separate the first vent 4*a* and the second vent 4*b* can obstruct the airflow from the second vent 4*b* to the first vent 4*a*, thus reducing the decrease in the velocity of the exhaust airflow from the axial fan 12 and the decrease in the performance of the axial fan 12 in ventilating the housing 2.

The second plate 23 may be at any position outside the housing 2 at which the second plate 23 separates the first vent 4*a* and the second vent 4*b*. The second plate 23 may be any member that can serve as a baffle that obstructs airflow from the second vent 4*b* to the first vent 4*a*. The second plate 23 may be made of any of various materials that can obstruct airflow and withstand heat of the exhaust airflow from the axial fan 12. Examples of such materials include various metals such as aluminum, iron, stainless steel, or copper, various plastics such as epoxy resins, phenolic resins, fluoropolymers, polycarbonates, or polypropene, or paper or wood, and any combination of the above materials. The second plate 23 may be transparent, translucent, or opaque. The second plate 23 may have the same or similar color to the housing 2 or the first plate 13, or may have a different color. The second plate 23 may be placed using any of various components including supports with any of various dimensions and shapes, such as rod-like, tubular, columnar, or plate-like supports or using screws to fix the second plate 23 to the housing 2. In some embodiments, the second plate 23 may be fixed to the housing 2 with an adhesive, solder, or a brazing material.

The second plate 23 may have any shape other than the plate in the embodiments illustrated in FIGS. 1, 2A, and 2B. The second plate 23 may have any shape such as a curved, bent, or corrugated plate that obstructs the airflow from the second vent 4*b* to the first vent 4*a* in accordance with the specifications of the light irradiator 1.

The second plate 23 extends outside the housing 2 in the direction intersecting with the direction linking the first vent 4*a* and the second vent 4*b* to separate the first vent 4*a* and the second vent 4*b*. The direction linking the first vent 4*a* and the second vent 4*b* may be, for example, the direction parallel to the straight line connecting the center of the first vent 4*a* and the center of the second vent 4*b* (or the center of any multiple first vents 4*a* across the first vents 4*a* and the center of any multiple second vents 4*b* across the second vents 4*b*). The direction intersecting with the linking direction may include, other than the direction orthogonal to the linking direction, any direction obliquely intersecting with the linking direction in which the second plate 23 obstructs the airflow between the first vent 4*a* and the second vent 4*b* outside the housing 2.

The second plate 23 may have a width (dimension in the direction along the second side of the housing 2) greater than or equal to a narrower one of the widths of the first vent 4*a* and the second vent 4*b* (dimensions in the direction along the second side of the housing 2). For multiple first vents 4*a* or multiple second vents 4*b*, the second plate 23 may have a width greater than or equal to the total width of the first vents 4*a* or the second vents 4*b*. The second plate 23 with such a width can effectively obstruct the airflow between the first vent 4*a* and the second vent 4*b* outside the housing 2. The second plate 23 may have a width greater than or equal to a wider one of the widths of the first vent 4*a* and the second vent 4*b*. The second plate 23 with such a width can effectively obstruct the airflow between the first vent 4*a* and the second vent 4*b* outside the housing 2.

The second plate 23 may have a width less than or equal to the width of the light irradiator 1 (the second dimension 2B of the second side of the housing 2) for miniaturization of the light irradiator 1 and also for arranging multiple light irradiators 1. The width of the second plate 23 may be greater than the width of the light irradiator 1. In this case, multiple light irradiators 1 may be arrayed using the second plates 23 staggered in adjacent light irradiators 1 in the direction along the third side of the housing 2.

The second plate 23 may have a height from the second surface 2*b* of the housing 2 (dimension in the direction along the first side of the housing 2) greater than or equal to a height to intersect with the straight line linking the end of the lower surface of the first plate 13 nearer the first vent 4*a* and the end of the first vent 4*a* nearer the second vent 4*b*. The second plate 23 having such a height can effectively obstruct the airflow exhausted from the axial fan 12 through the second vent 4*b* and directed to the first vent 4*a* by the lower surface of the first plate 13. The second plate 23 may have a height greater than or equal to the spacing between the first plate 13 and the housing 2 (the spacing between the lower surface of the first plate 13 and the second surface 2*b* of the housing 2 or the height from the second surface 2*b* of housing 2 to the lower surface of the first plate 13). The second plate 23 with such a height can effectively obstruct the airflow from the second vent 4*b* to the first vent 4*a* outside the housing 2. The height of the second plate 23 may have an upper limit set as appropriate to reflect the intended size of a smaller light irradiator 1 and the space limitations in the printer to incorporate the light irradiator 1.

In the embodiments illustrated in FIGS. 1, 2A, and 2B, the second plate 23 has a constant height across the width, but may have its height varying across the width. The airflow from the second vent 4*b* to the first vent 4*a* may be obstructed with the second plate 23 that is partially higher in the middle portion or end portions, or partially higher in a portion in which the second plate 23 intersects with the straight line linking the center of the first vent 4*a* and the center of each of multiple second vents 4*b*.

The second plate 23 may have any thickness. A thin second plate 23 that can obstruct the airflow from the second vent 4*b* to the first vent 4*a* may be used to reduce the weight of the light irradiator 1. In some embodiments, the second plate 23 may be relatively thick to increase its strength and durability. The second plate 23 may be replaced with a thick block that provides the capability of the second plate 23. Instead of being attached to the housing 2, such a thick second plate 23 may be integral with the housing 2. In this case, the housing 2 may be shaped to include a partially protruding second surface.

The second plate 23 outside the housing 2, or more specifically, on the second surface 2*b* of the housing 2 may be at any position between the first vent 4*a* and the second vent 4*b*. The second plate 23 may be nearer the first vent 4*a* as an inlet, rather than nearer the second vent 4*b* as an outlet. The second plate 23 nearer the second vent 4*b* can increase the resistance of the exhaust airflow depending on the relationship with the first plate 13. Such inconvenience is to be avoided. The second plate 23 nearer the first vent 4*a* effectively obstructs the airflow from the second vent 4*b* to the first vent 4*a*. The second plate 23 may be near the first vent 4*a*. In the embodiments illustrated in FIGS. 1, 2A, and 2B, the second plate 23 is near the first vent 4*a*. The second plate 23 may be near the first vent 4*a* as appropriate in accordance with the specifications of the light irradiator 1. The second plate 23 near the first vent 4*a* as an inlet effectively obstructs the airflow from the second vent 4*b* to the first vent 4*a*.

Although the second plate 23 may have a height greater than or equal to a height to intersect with the straight line linking the end of the lower surface of the first plate 13 nearer the first vent 4*a* and the end of the first vent 4*a* nearer the second vent 4*b* as described above, the second plate 23 near the first vent 4*a* as an inlet may have a height that is too low and is impractical. The second plate 23 may thus have a height greater than or equal to the height described above and to obstruct the airflow from the second vent 4*b* to the first vent 4*a*. In this case as well, the second plate 23 having a height greater than or equal to the spacing between the first plate 13 and the housing 2 effectively obstructs the airflow from the second vent 4*b* to the first vent 4*a*.

As described above, for the fan size 12A of 40 mm for example, the first plate 13 placed with the spacing D1 of, for example, 7 to 3 mm that is less than the spacing D2 of 8 mm increases the airflow velocity by up to about 25% from the velocity decreasing greatly by about 40%. The second plate 23 further increases the airflow velocity by up to about 10%, effectively maintaining the heat-dissipating member 9 at an intended temperature of about 60° C.

For the fan size 12A of 50 mm for example, the first plate 13 placed with the spacing D1 of, for example, 7 to 3 mm that is less than the spacing D2 of 8 mm increases the airflow velocity by up to about 175% from the velocity decreasing greatly by about 60%. The second plate 23 further increases the airflow velocity by up to about 15%, effectively maintaining the heat-dissipating member 9 at an intended temperature of about 60° C.

The housing 2 includes the light source 7 facing the light-emission opening 3 in the first surface 2*a*. The light source 7 may include, for example, a matrix array of LEDs on the light source substrate 8. The light source 7 may include GaN LEDs that emit ultraviolet rays. In another embodiment, the light source 7 may include GaAs LEDs that emit infrared rays. The light source 7 may be selectable in accordance with the wavelength to be used. The light source substrate 8 may be, for example, a ceramic wiring board. The ceramic wiring board includes a ceramic base (insulating substrate), which resists heat. Thus, the ceramic wiring board may be used as the light source substrate 8 for the light source 7 that includes LEDs generating heat.

The heat-dissipating member 9 dissipates heat resulting from light emission from the light source 7. The heat-dissipating member 9 is thermally connected to the light source 7. The heat-dissipating member 9 is made of a thermally conductive metal, such as aluminum or copper. The heat-dissipating member 9 may be formed by cutting a rectangular block of aluminum or copper to form multiple channels (with the remaining parts serving as fins) to increase the surface area. In some embodiments, the heat-dissipating member 9 includes multiple sheets of aluminum or copper attached to a metal plate or block made of aluminum or copper to serve as fins, between which outside air flows.

Figure 4A:
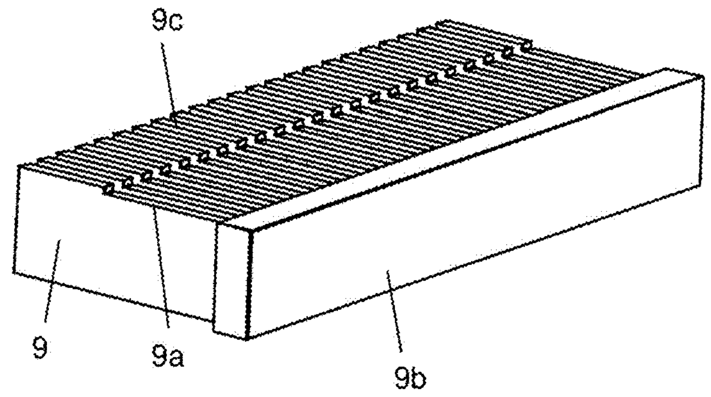
FIG. 4A is a perspective view of a heat-dissipating member for the light irradiator according to the embodiment of the present disclosure.
Figure 4B:
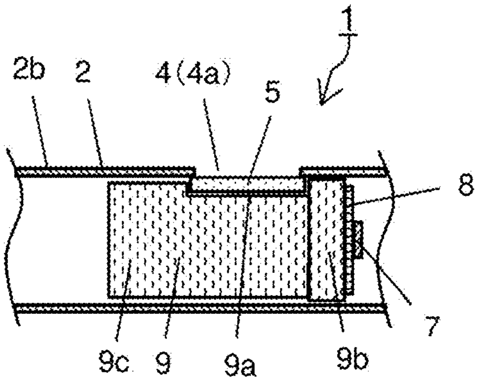
FIG. 4B is a schematic partial cross-sectional view of the light irradiator according to the embodiment of the present disclosure.

As illustrated in FIGS. 2A and 2B, in a perspective view of FIG. 4A, and in a schematic partial cross-sectional view of the light irradiator 1 of FIG. 4B, the heat-dissipating member 9 may occupy, in the housing 2, a space extending in the direction along the first side (along the first dimension 2A) of the first surface 2*a*. The heat-dissipating member 9 may include a recess 9*a* recessed in the direction along the first side and facing the first vent 4*a* in the second surface 2*b*. The recess 9*a* can accommodate a filter 5 to face the first vent 4*a*. The filter 5 to reduce dust or other matter entering the housing 2 can be arranged in a space-efficient manner to achieve a thinner light irradiator 1.

The heat-dissipating member 9 occupying, in the housing 2, a space extending in the direction along the first side is not limited to the heat-dissipating member 9 fully occupying the space between the inner surface of the housing 2 adjacent to the second surface 2*b* and the inner surface opposite to this inner surface. The heat-dissipating member 9 may substantially occupy a major part of the space with clearances left in the direction along the first side. For example, the housing 2 may include clearances around the heat-dissipating member 9 for attachment or detachment or for accommodating thermal expansion. The recess 9*a* may not face the entire first vent 4*a*. The recess 9*a* may have dimensions to partially face the first vent 4*a* and fit in the first vent 4*a*. In some embodiments, the recess 9*a* may be larger than and extend beyond the first vent 4*a*, or extend across inside and outside the first vent 4*a*. The recess 9*a* may have any depth determined as appropriate for the shape and size of the filter 5.

The filter 5 may include, for example, a sponge or a nonwoven fabric. The filter 5 prevents foreign matter such as dust and dirt in outside air from entering the housing 2 and thus prevents the efficiency of the heat dissipation from the light source 7 or the drive 11 from decreasing due to such dust and dirt accumulating on the heat-dissipating member 9 or the drive 11. This improves the reliability of the light irradiator 1. The filter 5 also decelerates the flow of outside air around the vent 4.

For example, the filter 5 may have about a 1 mm greater width and a 1 mm greater length than the first vent 4*a*, and may have a thickness of about 1 mm. The recess 9*a* may have the same shape as the filter 5. The filter 5 thus allows passage of all the incoming air entering through the first vent 4*a*, thus reliably removing foreign matter from the incoming air. The filter 5 is received in the recess 9*a* to face the first vent 4*a* and in contact with the fins in the heat-dissipating member 9, allowing passage of all the incoming air entering through the first vent 4*a* between the fins in the heat-dissipating member 9 for efficient heat dissipation.

The heat-dissipating member 9 illustrated in FIGS. 4A and 4B includes a metal block 9*b* with multiple metal sheets 9*c* attached as fins. The sheets 9*c* include cutouts having the same shapes and sizes in their upper portions in the figures. The cutouts and the block 9*b* define the recess 9*a*. However, the recess 9*a* may have any other structure.

Figure 4C:
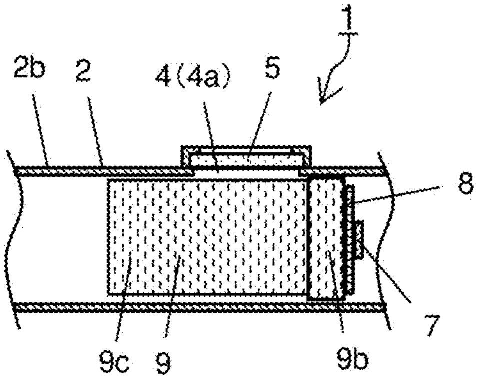
FIG. 4C is a schematic partial cross-sectional view of a light irradiator according to another embodiment.

The filter 5 may be attached in a different manner, without using the recess 9*a* in the heat-dissipating member 9. For example, the heat-dissipating member 9 in the housing 2 may include no recess as illustrated in a schematic partial cross-sectional view of FIG. 4C similar to FIG. 4B. The housing 2 may include the filter 5 facing the first bent 4*a* located outside the first vent 4*a*. The filter 5 may be covered with a frame.

The heat-dissipating member 9 may be connected to the light source substrate 8 with, for example, thermal grease. The grease increases the adhesion between the heat-dissipating member 9 and the light source substrate 8 to improve the thermal connection. This improves the efficiency of heat dissipation from the light source 7.

The light irradiator 1 includes the drive (drive board) 11 in the housing 2. The drive 11 is electrically connected to the light source 7 to drive the light source 7. The drive 11 includes the drive circuit 10 for supplying power to the light source 7 and controlling light emission. The drive 11 may also drive the axial fan 12 as a blower and control the rotational speed of the axial fan 12 in accordance with heat generation from the light source 7. The drive 11 including the drive circuit 10 generates heat in driving the light source 7 or controlling the axial fan 12. Such heat is to be appropriately dissipated for cooling.

The drive 11 may include a heat-dissipating member, such as a heat sink, for dissipating heat from electronic components such as power transistors that easily reach high temperatures in, for example, the drive circuit 10. The housing 2 may include channels, fins, an air deflector, or other components on the inner surface around the drive 11 to allow the outside air to effectively flow to parts of the drive 11 that easily reach high temperatures. The drive 11 is typically a drive board including a wiring board. The drive circuit 10 is typically a drive circuit board including a wiring board.

As illustrated in FIGS. 2A and 2B, the drive 11 in the housing 2 may be adjacent to the second surface 2*b* including the first and second vents 4*a* and 4*b* with the drive circuit 10 facing the internal space of the housing 2. In other words, the drive 11 in the housing 2 may be nearer the inner surface adjacent to the second surface 2*b* including the first and second vents 4*a* and 4*b* in the direction along the first side with the first dimension 2A. In this case, the drive 11 may receive the drive circuit 10 facing the internal space of the housing 2, or in other words, facing the surface without the first and second vents 4*a* and 4*b*. Thus, a passage of the outside air, entering through the first vent 4*a* and flowing through the heat-dissipating member 9 to the axial fan 12, is effectively defined by the drive 11 between the heat-dissipating member 9 and the axial fan 12 in the housing 2 and by the inner surface of the housing 2 opposite to the second surface 2*b* including the vents 4. The drive circuit 10 can be located in the passage of the outside air in the housing 2 to allow efficient dissipation of heat from the drive circuit 10 and the drive 11. This improves the operational stability of the drive circuit 10 and the drive 11 and the reliability of the light irradiator 1.

To place the drive 11 in the housing 2 in this manner, the drive 11 may be fastened with, for example, screws with a base, a support, or a spacer placed as appropriate between the drive 11 and one or both of the inner surface of the housing 2 adjacent to the second surface 2*b* and the inner surface opposite to this inner surface. The housing 2 includes a relatively large space between the drive 11 and the inner surfaces, and thus allows relatively flexible positioning of the fastening portions. The drive 11 may be fastened to one or both of the inner surfaces adjacent to the pair of third surfaces 2*c* of the housing 2 as appropriate with fasteners.

The drive 11 in the housing 2 may be nearer the inner surface opposite to the second surface 2*b* including the first and second vents 4*a* and 4*b* in the direction along the first side with the first dimension 2A. In this case, the drive 11 may receive the drive circuit 10 facing the internal space of the housing 2, or in other words, facing the surface with the first and second vents 4*a* and 4*b*. Thus, a passage of the outside air, entering through the first vent 4*a* and flowing through the heat-dissipating member 9 to the axial fan 12, is effectively defined by the drive 11 between the heat-dissipating member 9 and the axial fan 12 in the housing 2 and by the inner surface of the housing 2 adjacent to the second surface 2*b* including the vents 4. The drive circuit 10 can be located in the passage of the outside air in the housing 2 to allow efficient dissipation of heat from the drive circuit 10 and the drive 11.

Figure 5:
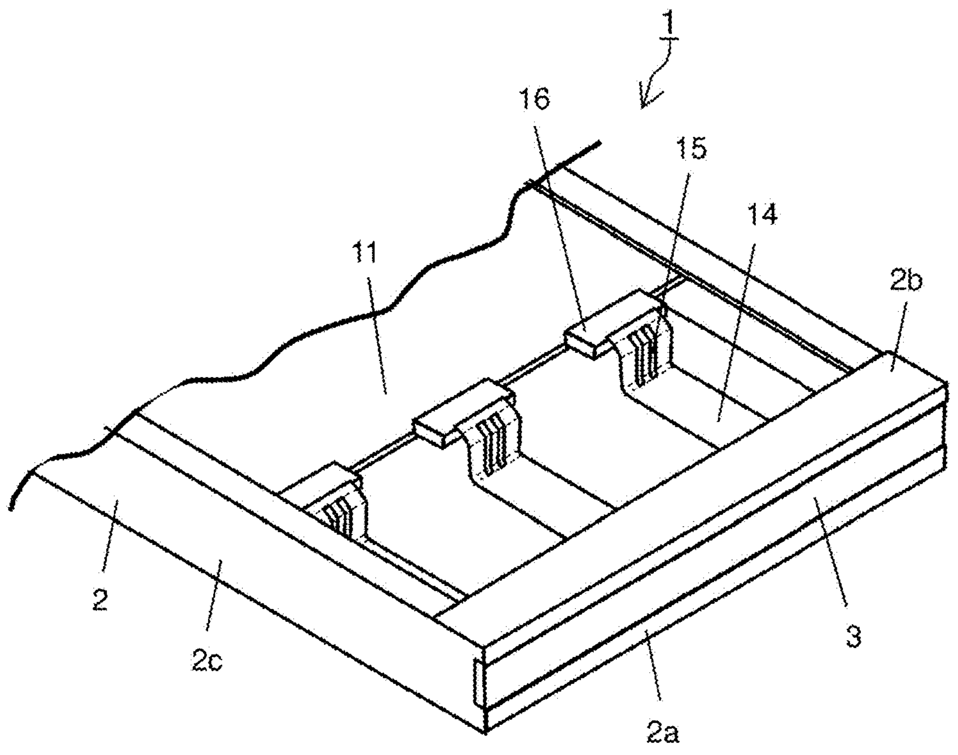
FIG. 5 is a schematic partial perspective view of the light irradiator according to the embodiment of the present disclosure.

The drive circuit 10 in the drive 11 is electrically connected to the light source 7 with the light source substrate 8 in between using wiring members. An example of the wiring members is illustrated in a partial perspective view of FIG. 5. FIG. 5 does not illustrate a part of the second surface 2*b* of the housing 2 to illustrate the drive 11. The light irradiator 1 in the embodiment illustrated in FIG. 5 includes FPCs (flexible printed circuits) as wiring members 14 electrically connecting the drive 11 to a light source (not illustrated) facing the light-emission opening 3 in the housing 2. The FPCs include multiple wires and may carry a relatively high current. The FPCs, which serve as the flexible wiring members 14, may also be routed in the housing 2. As illustrated in FIG. 5, the wiring members 14 using FPCs extend from the light source and the light source substrate (not illustrated) thermally connected to the heat-dissipating member 9. The wiring members 14 further extend along the heat-dissipating member 9 without passing through the heat-dissipating member 9. The wiring members 14 are raised for electrical connection to the drive 11 after passing the heat-dissipating member 9. Components 16 are board-to-FPC connectors that connect the wiring members 14 to the drive 11.

The wiring members 14 using flexible FPCs are generally thin and wide. The wiring members 14 include portions raised toward the drive 11, which may obstruct the airflow through the heat-dissipating member 9 to the axial fan 12 in the housing 2 generated by the axial fan 12. Thus, the flexible wiring members 14 connecting the light source to the drive 11 may include multiple wires extending along the heat-dissipating member 9, and the wiring members 14 may include slits 15 between the wires in an area of airflow generated by the axial fan 12. Each wiring member 14 may include multiple slits 15. The wiring members 14 with the slits 15 avoid obstructing air flowing through the heat-dissipating member 9, thus reducing the decrease in the heat dissipation efficiency.

The flexible wiring members 14 may extend along the heat-dissipating member 9. In this case, the wiring members 14 have portions along the heat-dissipating member 9 between the heat-dissipating member 9 and the inner surface of the housing 2 and portions raised toward the drive 11. These portions may extend in direct contact with or slightly away from the heat-dissipating member 9. The wiring members 14 extending in direct contact with the heat-dissipating member 9 may save space. The wiring members 14 extending slightly away from the heat-dissipating member 9 may reduce obstruction of airflow. Also, the wiring members 14 and the drive 11 may be effectively protected against heat. The wiring members 14 may have any layout with the slits 15 at any location and with any shape and size as appropriate for the design for appropriate airflow through the housing 2.

Figure 6:
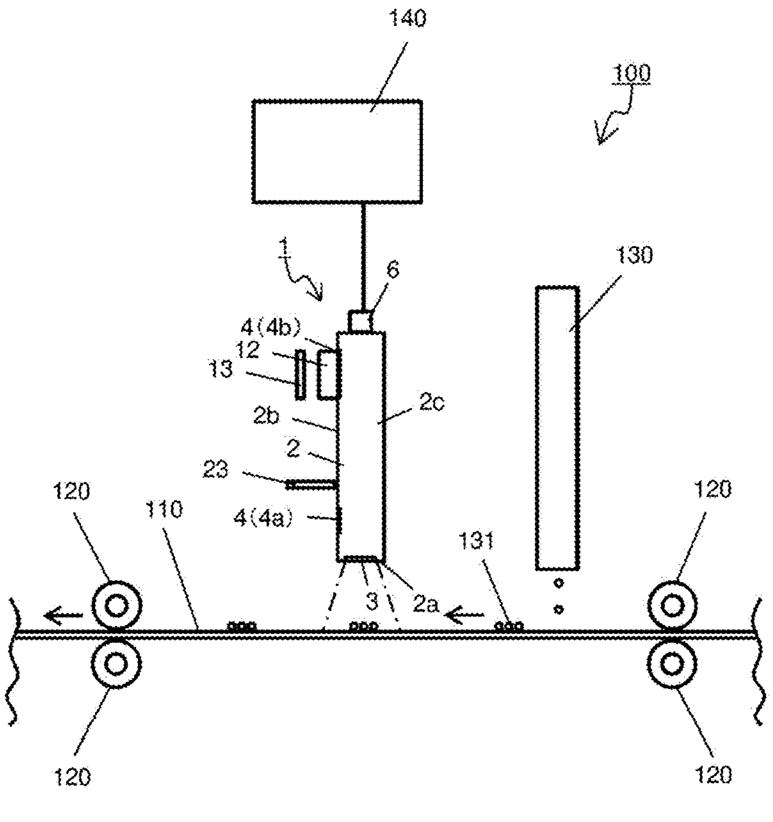
FIG. 6 is a schematic front view of a printer according to an embodiment of the present disclosure.

FIG. 6 is a schematic front view of a printer according to the embodiment of the present disclosure. A printer 100 according to the embodiment illustrated in FIG. 6 includes the light irradiator 1 according to the embodiment of the present disclosure, a feeder 120 for feeding a print medium 110 to be irradiated with light emitted from the light irradiator 1 through the light-emission opening 3, and a printing unit 130 upstream from the light irradiator 1 in the feed direction of the print medium 110 to print on the print medium 110 being fed. In the printer 100 in the present embodiment, the printing unit 130 includes IJ (inkjet) heads that use, for example, ultraviolet curable inks.

The printer 100 with this structure includes the thin and small light irradiator 1 located near the printing unit 130. Thus, the printer 100 is space-saving. The light irradiator 1 causes the outside air (air) to flow in through the first vent **4*a* and out through the second vent 4*b*. The light irradiator 1 allows the printing unit 130 and the print medium 110 to be less susceptible to the airflow when irradiating the printed print medium 110. Thus, the printer 100** is small and reliable.

In the printer 100, the feeder 120 feeds the print medium 110 from right to left in the figure. The feeder 120 in the present embodiment includes pairs of drive rollers upstream and downstream in the feed direction. A support for supporting the print medium 110 being fed may be provided near or integral with the feeder 120. The printing unit 130 ejects, for example, an ultraviolet curable ink 131 onto the print medium 110 being fed and deposits the ink 131 onto the surface of the print medium 110. The ink 131 may be deposited entirely or partially onto the surface of the print medium 110 with any pattern as intended. In the printer 100, the light irradiator 1 irradiates the ultraviolet curable ink 131 on the print medium 110 with ultraviolet rays to cure the ink 131. The photosensitive material used in the present embodiment is the ultraviolet curable ink 131. The photosensitive material in another embodiment may be a photoresist or a photocurable resin.

The light irradiator 1 is connected to a controller 140 for controlling light emission from the light irradiator 1. The controller 140 includes an internal memory storing information indicating the properties of light relatively suitable for curing a photocurable ink 131 to be ejected from the IJ heads as the printing unit 130.

Examples of the stored information include numerical values representing the wavelength distribution characteristics and the emission intensities (the emission intensity for each wavelength range) suitable for curing the ink 131 to be ejected in droplets. In the printer 100 in the present embodiment, the controller 140 also adjusts the level of the drive current to be input into the multiple light emitters in the light source 7 based on the information stored in the controller 140. The light irradiator 1 in the printer 100 thus emits an appropriate amount of light in accordance with the characteristics of the ink used. This allows the ink 131 to be cured with relatively low-energy light.

The printing unit 130 in the present embodiment includes line IJ heads. The IJ heads 130 each include multiple ink ejection nozzles linearly arrayed to eject, for example, an ultraviolet curable ink. The IJ heads as the printing unit 130 print the print medium 110 by ejecting ink from the ejection nozzles and depositing the ink 131 onto the print medium 110 being fed in a direction orthogonal to the array of ejection nozzles in the depth direction.

The printing unit 130 is not limited to the line IJ heads. For example, the printing unit 130 may include serial IJ heads. In some embodiments, the printing unit 130 may include electrostatic heads that electrostatically deposit a developer (toner) onto the print medium 110 charged with static electricity. In some embodiments, the printing unit 130 may include a liquid developing device in which the print medium 110 is immersed in a liquid developer or toner to deposit the toner onto the print medium 110. In some embodiments, the printing unit 130 may include a brush or a roller for feeding a developer (toner).

When the printer 100 in the present embodiment is a line printer, the light irradiator 1 may include the first surface **2*a* elongated in the depth direction in the figure in accordance with the width of the print medium 110. In some embodiments, multiple light irradiators 1 may be arrayed in the depth direction in the figure in accordance with the width of the print medium 110**.

In the printer 100, the light irradiator 1 cures a photocurable ink 131, or exposes a photosensitive ink 131 to light on the print medium 110 being fed by the feeder 120. The light irradiator 1 is downstream from the printing unit 130 in the feed direction of the print medium 110.

The printer 100 in the present embodiment may use an ink 131 other than the ultraviolet curable ink 131. For example, the printer 100 may print a water- or oil-based ink 131 on the print medium 110 using the IJ heads as the printing unit 130, and irradiate the print medium 110 with infrared rays using the light irradiator 1 to dry and fix the ink 131 with the heat. In this case, the printer 100 may use any printing method, as well as inkjet printing, that can fix the ink 131 on the print medium 110 with infrared rays.

The light irradiator 1 in the present embodiment is included in the printer 100 that uses the IJ heads as the printing unit 130. However, the light irradiator 1 may be included in one of various resin curing systems, including a system for applying a paste containing a photosensitive resin (e.g., a resist) to a target surface with spin coating or screen printing and then curing the coated or printed photosensitive resin. In some embodiments, the light irradiator 1 may be used as a light source in an exposure system that exposes, for example, a resist to light.

Although embodiments of the present disclosure have been described in detail, the present disclosure is not limited to the embodiments described above, and may be changed or modified in various manners without departing from the spirit and scope of the present disclosure.

The invention claimed is:

1. A light irradiator, comprising:

a light source including a plurality of light emitters;

a heat-dissipating member thermally connected to the light source;

a drive including a drive circuit for the light source;

a housing that is configured to accommodate the light source, the heat-dissipating member, and the drive, the housing including a plurality of vents and a light-emission opening to allow light from the light source to pass through the light-emission opening, the housing being rectangular and including a first surface having a first side with a first dimension and a second side with a second dimension greater than the first dimension, a second surface having the second side and a third side with a third dimension greater than the second dimension, and a third surface having the first side and the third side, the light-emission opening being in the first surface, a first vent and a second vent of the plurality of vents being in the second surface, the first vent being nearer the light-emission opening than the second vent, the second vent being located opposite to the light-emission opening, the light source being adjacent to the light-emission opening, the heat-dissipating member facing the first vent, the drive being between the first vent and the second vent;

an axial fan at the second vent, the axial fan being configured to blow air from inside the housing to outside the housing, the axial fan having a fan size greater than the first dimension and less than the second dimension;

a first plate at the second vent, the first plate facing the axial fan with a spacing less than or equal to the first dimension between the first plate and the axial fan; and a second plate outside the housing, the second plate separating the first vent and the second vent.

2. The light irradiator according to claim 1, wherein the second plate has a width in a direction along the second side greater than or equal to a narrower one of a width of the first vent and a width of the second vent in the direction along the second side.

3. A printer, comprising:

the light irradiator according to claim 2;

a feeder configured to feed a print medium to be irradiated with light emitted from the light irradiator through the light-emission opening; and a printing unit upstream from the light irradiator in a feed direction of the print medium.

4. The light irradiator according to claim 1, wherein the second plate has a height greater than or equal to a spacing between the first plate and the housing.

5. A printer, comprising:

the light irradiator according to claim 4;

a feeder configured to feed a print medium to be irradiated with light emitted from the light irradiator through the light-emission opening; and a printing unit upstream from the light irradiator in a feed direction of the print medium.

6. The light irradiator according to claim 1, wherein the second plate is nearer the first vent than the second vent.

7. A printer, comprising:

the light irradiator according to claim 6;

a feeder configured to feed a print medium to be irradiated with light emitted from the light irradiator through the light-emission opening; and a printing unit upstream from the light irradiator in a feed direction of the print medium.

8. A printer, comprising:

the light irradiator according to claim 1;

a feeder configured to feed a print medium to be irradiated with light emitted from the light irradiator through the light-emission opening; and a printing unit upstream from the light irradiator in a feed direction of the print medium.

* * * * *